(12) United States Patent
Fukutomi

(10) Patent No.: US 10,489,890 B2
(45) Date of Patent: Nov. 26, 2019

(54) IMAGE-PROCESSING APPARATUS, IMAGE-PROCESSING METHOD, AND IMAGE-PROCESSING PROGRAM

(71) Applicant: OLYMPUS CORPORATION, Hachioji-shi, Tokyo (JP)

(72) Inventor: Takeshi Fukutomi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 165 days.

(21) Appl. No.: 15/607,151

(22) Filed: May 26, 2017

(65) Prior Publication Data

US 2017/0262964 A1    Sep. 14, 2017

Related U.S. Application Data

(63) Continuation of application No. PCT/JP2014/081536, filed on Nov. 28, 2014.

(51) Int. Cl.
*G06K 9/40* (2006.01)
*G06T 5/00* (2006.01)
(Continued)

(52) U.S. Cl.
CPC .............. *G06T 5/002* (2013.01); *G06T 5/20* (2013.01); *G06T 7/0004* (2013.01); *G06T 7/90* (2017.01); *H04N 9/045* (2013.01); *H04N 9/646* (2013.01); *G06T 2207/10024* (2013.01); *G06T 2207/30168* (2013.01)

(58) Field of Classification Search
None
See application file for complete search history.

(56) References Cited

U.S. PATENT DOCUMENTS

2007/0103564 A1    5/2007  Chiba
2007/0153341 A1    7/2007  Kang
(Continued)

FOREIGN PATENT DOCUMENTS

JP      4447649 B2    4/2010
JP      4487902 B2    6/2010
(Continued)

OTHER PUBLICATIONS

International Search Report (ISR) and Written Opinion dated Feb. 17, 2015 issued in International Application No. PCT/JP2014/081536.

*Primary Examiner* — Stephen P Coleman
(74) *Attorney, Agent, or Firm* — Holtz, Holtz & Volek PC

(57) ABSTRACT

Provided is an image-processing apparatus including: a total-pixel-value calculating portion that calculates sums of values of pixels arrayed in a first and second direction on either side of a pixel-of-interest; and an occurrence-origin detecting portion that detects the pixel-of-interest as an occurrence origin of on-axis chromatic aberration where a magnitude relationship between the sum of G values and that of R values of the pixels arrayed in the first direction is inverted with respect to a magnitude relationship between the sum of G values and that of R values of the pixels arrayed in the second direction or where a magnitude relationship between the sum of the G values and that of B values of the pixels arrayed in the first direction is inverted with respect to a magnitude relationship between the sum of the G values and that of B values of the pixels arrayed in the second direction.

14 Claims, 11 Drawing Sheets

(51) Int. Cl.
*G06T 5/20* (2006.01)
*H04N 9/64* (2006.01)
*G06T 7/00* (2017.01)
*H04N 9/04* (2006.01)
*G06T 7/90* (2017.01)

(56) References Cited

U.S. PATENT DOCUMENTS

| | | |
|---|---|---|
| 2011/0199534 A1 | 8/2011 | Kawai |
| 2011/0234858 A1 | 9/2011 | Saito |
| 2013/0021495 A1 | 1/2013 | Ichiyama et al. |
| 2014/0119650 A1 | 5/2014 | Zhou |

FOREIGN PATENT DOCUMENTS

| | | |
|---|---|---|
| JP | 2011205477 A | 10/2011 |
| JP | 2012022286 A | 2/2012 |
| JP | 2012022287 A | 2/2012 |
| JP | 2012042988 A | 3/2012 |
| JP | 2013026755 A | 2/2013 |
| JP | 2013172402 A | 9/2013 |
| JP | 2014086932 A | 5/2014 |
| WO | 2007079039 A2 | 7/2007 |

FIG. 3

| (−m, −m) |  |  | (0, −m) |  |  | (m, −m) |
|---|---|---|---|---|---|---|
|  |  |  | ⋮ |  |  |  |
|  |  | (−1, −1) | (0, −1) | (1, −1) |  |  |
| (−m, 0) | ⋯ | (−1, 0) | (0, 0) | (1, 0) | ⋯ | (m, 0) |
|  |  | (−1, 1) | (0, 1) | (1, 1) |  |  |
|  |  |  | ⋮ |  |  |  |
| (−m, m) |  |  | (0, m) |  |  | (m, m) |

FIG. 10C

| GB | B | GB | B | GB | B | GB |
|----|---|----|---|----|---|----|
| R | GR | R | GR | R | GR | R |
| GB | B | GB | B | GB | B | GB |
| R | GR | R | GR (0, 0) | R | GR | R |
| GB | B | GB | B | GB | B | GB |
| R | GR | R | GR | R | GR | R |
| GB | B | GB | B | GB | B | GB |

IMAGE-PROCESSING APPARATUS, IMAGE-PROCESSING METHOD, AND IMAGE-PROCESSING PROGRAM

CROSS-REFERENCE TO RELATED APPLICATIONS

This is a continuation of International Application PCT/JP2014/081536, with an international filing date of Nov. 28, 2014, which is hereby incorporated by reference herein in its entirety.

TECHNICAL FIELD

The present invention relates to an image-processing, apparatus, an image-processing method, and an image-processing program.

BACKGROUND ART

It is known that on-axis chromatic aberration occurs in an image captured via a normal optical system. A technique for correcting such on-axis chromatic aberration by means of image processing has been proposed (for example, see Patent Literature 1).

With this technique, a near-saturated region having pixels that exceed a saturation threshold and candidate regions having pixels in which blue and red intensity values of the pixels considerably exceed green intensity values of the pixels are found, and the candidate regions that are adjacent to the near-saturated region are detected as on-axis-chromatic-aberration regions.

CITATION LIST

Patent Literature

{PTL 1} Publication of Japanese Patent No. 4447649

SUMMARY OF INVENTION

An aspect of the present invention is an image-processing apparatus including: a total-pixel-value calculating portion that separately calculates, for each color, sums of pixel values of pixels that are arrayed in a first direction and a second direction on either side of a pixel-of-interest in an image; and an occurrence-origin detecting portion that detects the pixel-of-interest as an occurrence origin of on-axis chromatic aberration in the case in which a magnitude relationship between the sum of G pixel values and that of R pixel values of the pixels that are arrayed in the first direction, which are calculated by the total-pixel-value calculating portion, is inverted with respect to a magnitude relationship between the sum of G pixel values and that of R pixel values of the pixels that are arrayed in the second direction or in the case in which a magnitude relationship between the sum of the G pixel values and that of B pixel values of the pixels that are arrayed in the first direction is inverted with respect to a magnitude relationship between the sum of the G pixel values and that of B pixel values of the pixels that are arrayed in the second direction.

In addition, another aspect of the present invention is an image-processing method including: a total-pixel-value calculating step of separately calculating, for each color, sums of pixel values of pixels that are arrayed in a first direction and a second direction on either side of a pixel-of-interest in an image; and an occurrence-origin detecting step of detecting the pixel-of-interest as an occurrence origin of on-axis chromatic aberration in the case in which a magnitude relationship between the sum of G pixel values and that of R pixel values of the pixels that are arrayed in the first direction, which are calculated in the total-pixel-value calculating step, is inverted with respect to a magnitude relationship between the sum of G pixel values and that of R pixel values of the pixels that are arrayed in the second direction or in the case in which a magnitude relationship between the sum of the G pixel values and that of B pixel values of the pixels that are arrayed in the first direction is inverted with respect to a magnitude relationship between the sum of the G pixel values and that of B pixel values of the pixels that are arrayed in the second direction.

In addition, another aspect of the present invention is an image-processing program that causes a computer to execute a total-pixel-value calculating step of separately calculating, for each color, sums of pixel values of pixels that are arrayed in a first direction and a second direction on either side of a pixel-of-interest in an image; and an occurrence-origin detecting step of detecting the pixel-of-interest as an occurrence origin of on-axis chromatic aberration in the case in which a magnitude relationship between the sum of G pixel values and that of R pixel values of the pixels that are arrayed in the first direction, which are calculated in the total-pixel-value calculating step, is inverted with respect to a magnitude relationship between the sum of G pixel values and that of R pixel values of the pixels that are arrayed in the second direction or in the case in which a magnitude relationship between the sum of the G pixel values and that of B pixel values of the pixels that are arrayed in the first direction is inverted with respect to a magnitude relationship between the sum of the G pixel values and that of B pixel values of the pixels that are arrayed in the second direction.

BRIEF DESCRIPTION OF DRAWINGS

FIG. 3 is a diagram showing the coordinate relationship between a pixel-of-interest and peripheral pixels thereof set in the image-processing apparatus in FIG. 1.

FIG. 10C is a diagram showing a pixel array in the case in which GB in an image that is acquired by using an image-acquisition element and that has pixels therein in a Bayer array are set to be pixels-of-interest.

DESCRIPTION OF EMBODIMENT

An image-processing apparatus 1 and an image-processing method according to an embodiment of the present invention will be described below with reference to the drawings.

Figure 1:
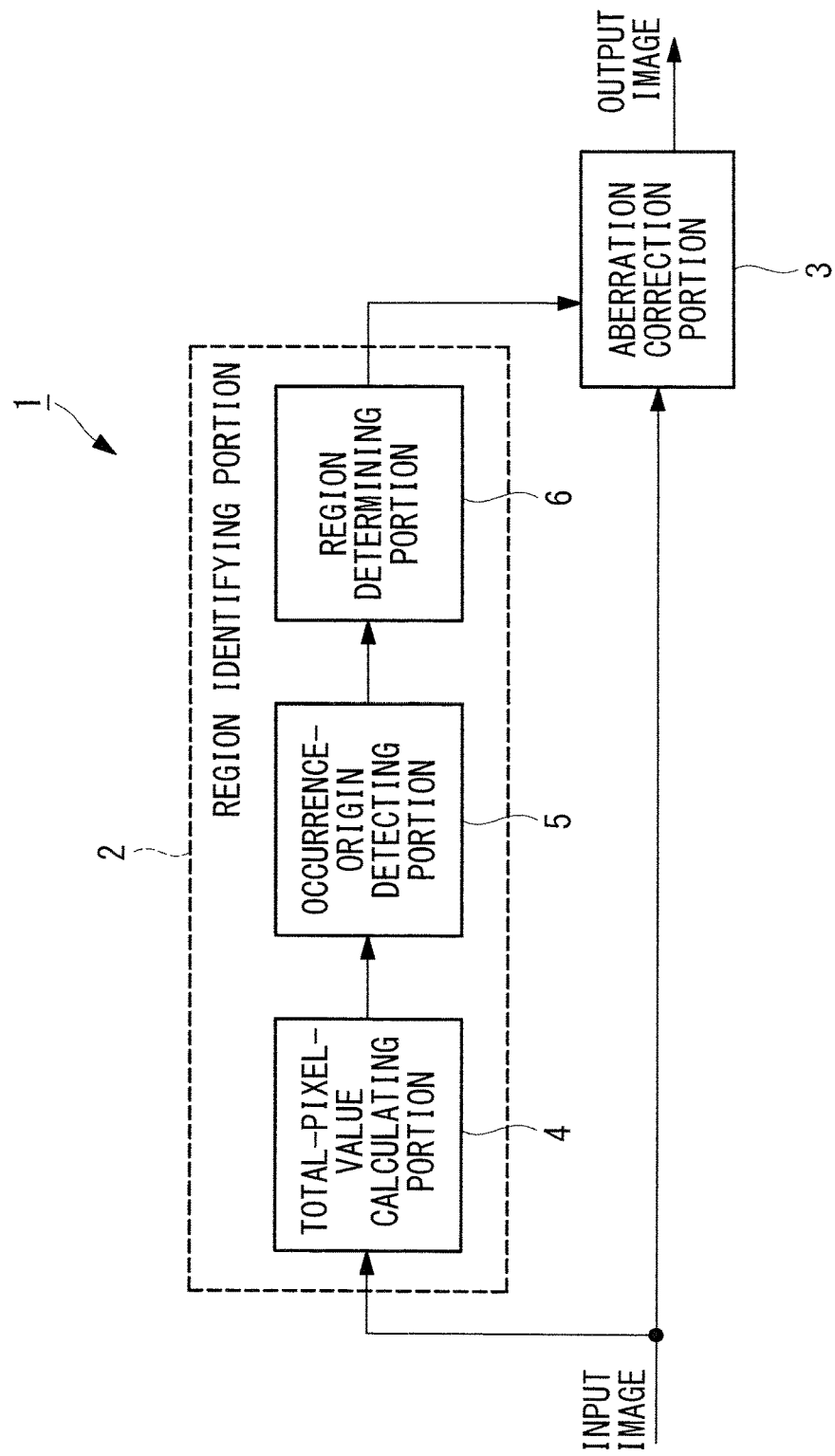
FIG. 1 is a block diagram showing an image-processing apparatus according to an embodiment of the present invention.

As shown in FIG. 1, the image-processing apparatus 1 according to this embodiment is provided with a region identifying portion 2 that identifies regions in which on-axis chromatic aberrations are occurring in an input image acquired by using a camera and an aberration correction portion (correction portion) 3 that outputs an output image in which the on-axis chromatic aberrations identified in the regions by the region identifying portion 2 have been corrected.

The region identifying portion 2 is provided with: a total-pixel-value calculating portion 4 that sets pixels-of-interest in the input image and that separately calculates, for each color, the sums of pixel values of pixels that are arrayed in a first direction and a second direction on either side of the set pixels-of-interest; an occurrence-origin detecting portion 5 that detects occurrence origins, of on-axis chromatic aberrations on the basis of the sums of the pixel values calculated by the total-pixel-value calculating portion 4; and a region determining portion 6 that determines predetermined peripheral regions that are in areas surrounding the occurrence origins detected by the occurrence-origin detecting portion 5 as on-axis-chromatic-aberration regions.

In this embodiment, the input image acquired by using a camera is in the form of image signals acquired by applying various types of image processing to digital signals that are converted from electrical signals by using an A/D converter after applying fixed noise pattern removal, analog gain adjustment, and so forth to the electrical signals, wherein the electrical signals are acquired by converting light that has entered the apparatus via an image-acquisition optical system (not shown) by using a solid-state image-acquisition element. This input image is a full-color image in which all of R, G, and B signal values are acquired in the individual pixels, and is an image which is a three-plane color image acquired by using a three-plane image-acquisition element or a single-plane color image acquired by using a single-plane image-acquisition element, which has been subjected to interpolation processing so that the R, C, and B values are acquired in the individual pixels thereof.

Figure 2:
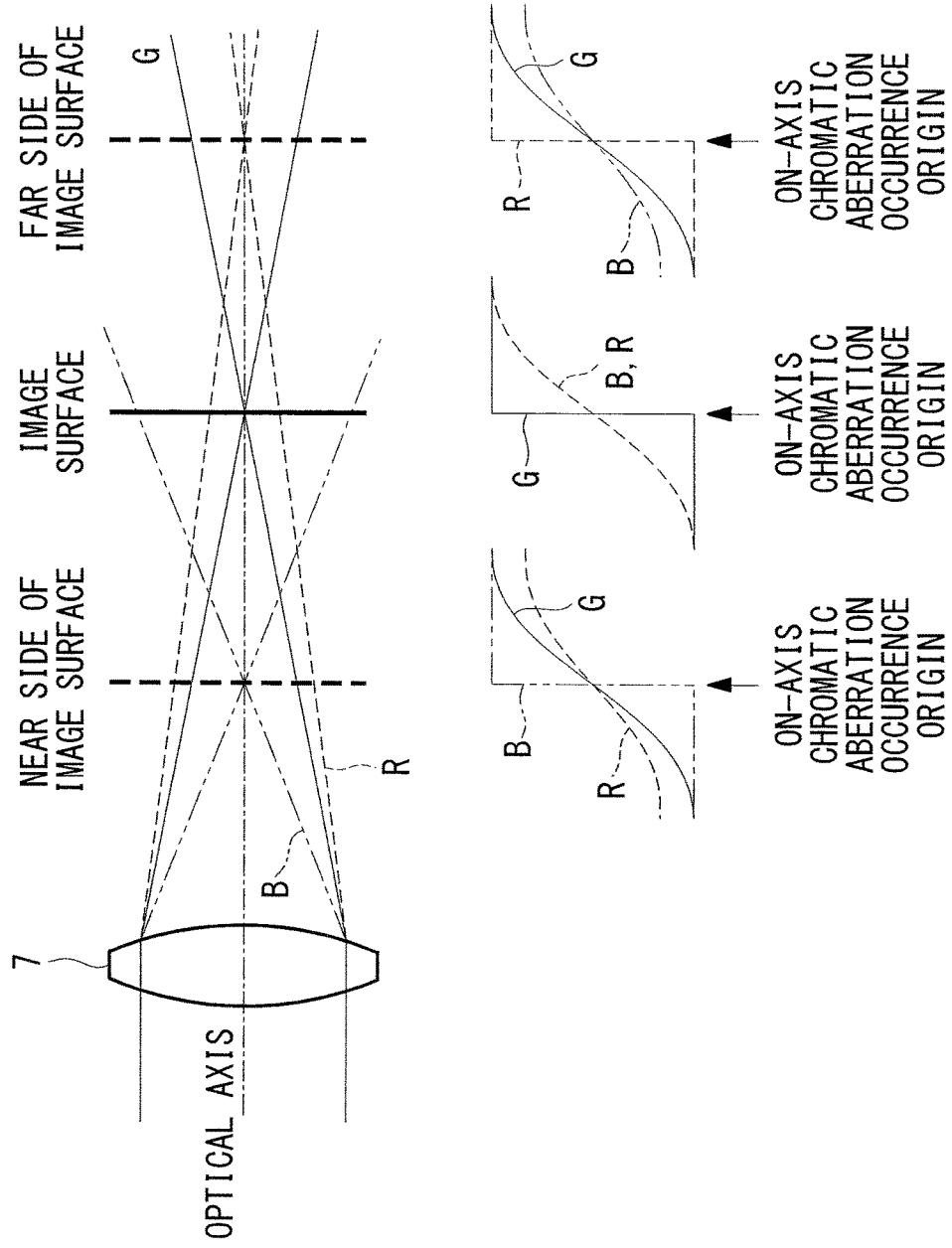
FIG. 2 is a diagram schematically showing the relationship between an optical system to which the image-processing apparatus in FIG. 1 is applied and on-axis chromatic aberration.

As shown in FIG. 2, the occurrence origins of on-axis chromatic aberrations detected by the occurrence-origin detecting portion 5 refer to the pixels-of-interest in the case in which colors differ between the first direction and the second direction in which pixels are arrayed in straight lines on either side of the pixels-of-interest.

In other words, in a normal optical system 7, it is known that beams of different wavelengths form images at different positions in the depth direction of the optical axis, as shown in FIG. 2. R signals, which generally have a greater wavelength tan G signals, form an image on the far side in the optical-axis direction, and B signals, which have a lower wavelength than G signals, form an image on the near side in the optical-axis direction. Displacement at the image forming positions the R, G, and signals appears as on-axis chromatic aberration.

In the case in which an achromatic step edge is captured, although the G signals hold a step-edge shape at the image surface, the R and B signals do not terra images, thus making the step-edge shapes thereof dull. On the other hand, on the far side of the image surface, although the step-edge shape is made dull because the G signals do not form an image, the R signals form an image, thus holding the step-edge shape. The B signals take an even duller shape than the G signals.

In contrast, on the near side of the image surface, although the step-edge shape is made dull because the G signals do not form an image, the B signals form an image, thus holding the step-edge shape. The R signals take an even duller shape than the G signals.

An image-processing method employing the thus-configured image-processing apparatus 1 according to this embodiment will be described below with reference to the drawings.

Figure 3:
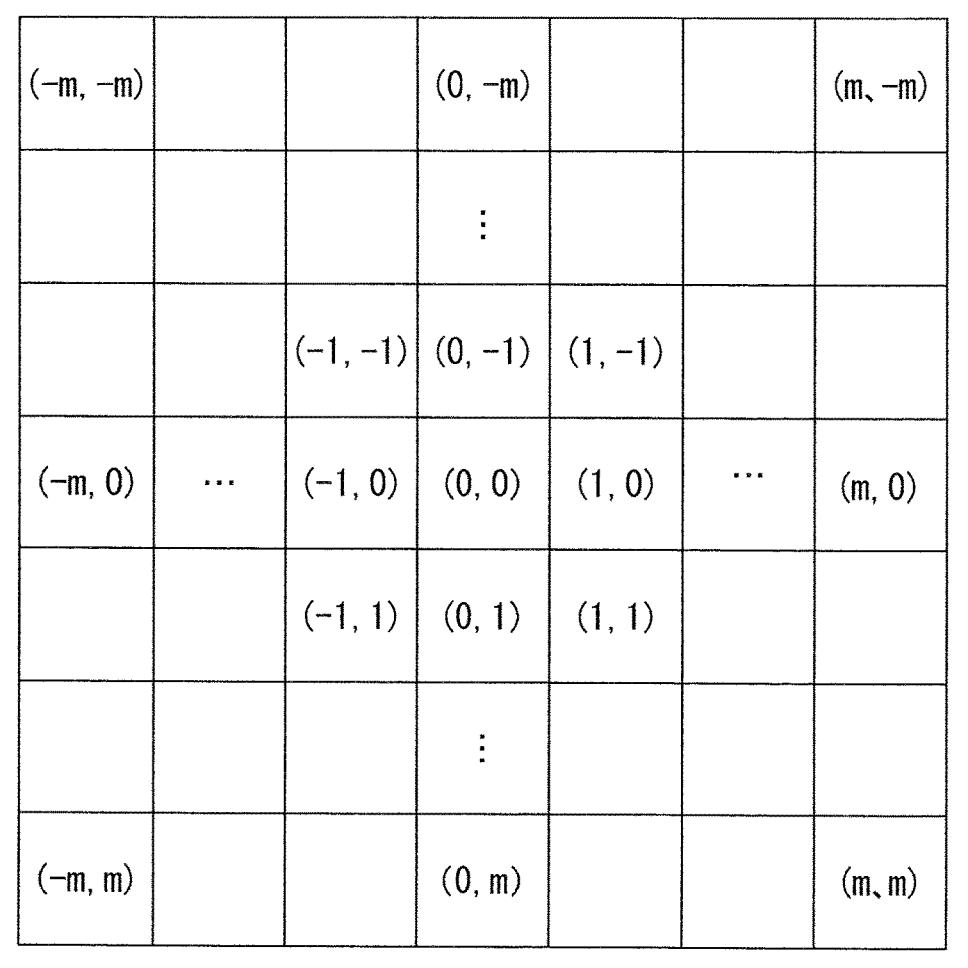
Figure 4:
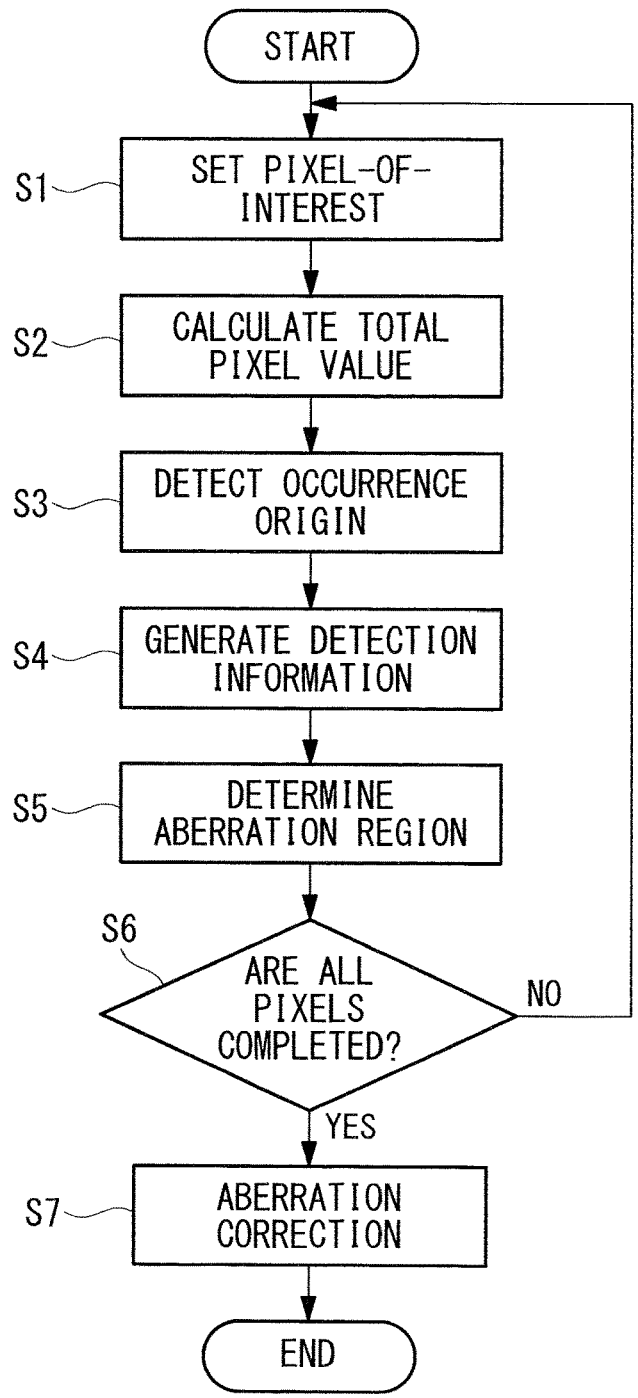
FIG. 4 is a flowchart for explaining an image-processing method employing the image-processing apparatus in FIG. 1.

As shown in FIGS. 3 and 4, the total-pixel-value calculating portion 4 is configured so as to set a pixel-of-interest (0,0) in the input image (step S1) and to separately calculate the sums of pixel values of a plurality of pixels arrayed on either side of the pixel-of-interest, for four directions centered on this pixel-of-interest, namely, the longitudinal direction, the lateral direction, the right diagonal direction, and the left diagonal direction (total-pixel-value calculating step S2).

Specifically, the calculation is as indicated in Eq. 1.

$$P_{cL} = \sum_{i=1}^{m} Pc(-i, 0) \quad \{Eq. 1\}$$

$$P_{cR} = \sum_{i=1}^{m} Pc(i, 0)$$

$$P_{cT} = \sum_{i=1}^{m} Pc(0, -i)$$

$$P_{cB} = \sum_{i=1}^{m} Pc(0, i)$$

$$P_{cLT} = \sum_{i=1}^{m} Pc(-i, -i)$$

$$P_{cLB} = \sum_{i=1}^{m} Pc(-i, i)$$

$$P_{cRT} = \sum_{i=1}^{m} Pc(i, -i)$$

$$P_{cRB} = \sum_{i=1}^{m} Pc(i, i)$$

Here, $P_c(x,y)$ is the pixel value of a pixel positioned at coordinates (x,y); $P_{cL}$ is the sum of the pixel values of the pixel array on the left side of the pixel-of-interest; $P_{cR}$ is the sum of the pixel values of the pixel array on the right side of the pixel-of-interest; $P_{cT}$ is the sum of the pixel values of the pixel array on the upper side of the pixel-of-interest; $P_{cB}$ is the sum of the pixel values of the pixel array on the lower side of the pixel-of-interest; $P_{cLT}$ is the sum of the pixel values of the pixel array on the upper left side of the pixel-of-interest; $P_{cLB}$ is the sum of the pixel values of the pixel array on the lower left side of the pixel-of-interest; $P_{cRT}$ is the sum of the pixel values of the pixel array on the upper right side of the pixel-of-interest; and $P_{cRB}$ is the sum of the pixel values of the pixel array on the lower right side of the pixel-of-interest. In addition, the subscript c means color, which can be replaced with r, g, or b. In addition, i and m are positive integers.

The occurrence-origin detecting portion 5 is configured so as to detect the pixel-of-interest as an occurrence origin of on-axis chromatic aberration in the case in which the sums of the pixel values calculated by using Eq. 1 satisfy all of conditional expressions (1) to (4) below (occurrence-origin detecting step S3).

$$Pg_{D1} > Pr_{D1} \quad (1)$$

$$Pg_{D2} < Pr_{D2} \quad (2)$$

$$Pg_{D1} > Pb_{D1} \quad (3)$$

$$Pg_{D2} < Pb_{D2} \quad (4)$$

Here, $Pg_{D1}$ is the sum of the G pixel values of pixels that are arrayed in a first direction D1 from the pixel-of-interest; $Pg_{D2}$ is the sum of the G pixel values of pixels that are arrayed in a second direction D2 from the pixel-of-interest; $Pr_{D1}$ is the sum of the R pixel values of pixels that are arrayed in the first direction D1 from the pixel-of-interest; $Pr_{D2}$ is the sum of the R pixel values of pixels that are arrayed in the second direction D2 from the pixel-of-interest; $Pb_{D1}$ is the sum of the B pixel values of pixels that are arrayed in the first direction D1 from the pixel-of-interest; and $Pb_{D2}$ is the sum of the B pixel values of pixels that are arrayed in the second direction D2 from the pixel-of-interest.

The subscript D1 indicates the first direction from the pixel-of-interest, and, for example, L, T, LT, and LB in Eq. 1 correspond to this direction. In addition, the subscript D2 indicates the second direction from the pixel-of-interest, and, for example, R, B, RT, and RB correspond to this direction. Although definitions of the directions are arbitrary, when L, T, LT, and LB are selected as D1, D2 is set to be R, B, RT, and RB.

Also, the occurrence-origin detecting portion 5 is configured so as to generate detection information in such a way that "0" is assigned to the pixels that are detected to be the occurrence origins of on-axis chromatic aberrations by satisfying all of conditional expressions (1) to (4), and "1" is assigned to the rest of the pixels that are detected not to be the occurrence origins (step S4).

The region determining portion 6 is configured so as to determine a predetermined region in an area surrounding a pixel for which the detection information assigned by the occurrence-origin detecting portion 5 is "0" as an on-axis-chromatic-aberration region (region determining step S5). The predetermined region can be set to be, for example, a 7×7 pixel region centered on a pixel for which the detection information is "0".

Then, when the processing has not been performed on all of the pixels, the procedure returns to step S1, and steps S2 to S5 are repeated after shifting the pixel-of-interest (step S6), and, when the processing has been performed on all of the pixels, correction processing is performed, by means of the aberration correction portion 3, on the on-axis-chromatic-aberration regions generated by the region determining portion 6 (correcting step S7), thus completing the processing.

As has been described above, with the image-processing apparatus 1 and the image-processing method according to this embodiment, because the occurrence origins of on-axis chromatic aberrations are detected on the basis of the magnitude relationship of, for each color, the sums of the pixel values of the pixels on either side of the pixels-of-interest, it is possible to detect pixels that are not part of a near-saturated region as the occurrence origins of on-axis chromatic aberrations. Therefore, it is also possible to correct on-axis chromatic aberration: in an image that does not include any near-saturated region. In addition, because the aberration correction is performed only on the regions determined to be the on-axis-chromatic-aberration regions, there is an advantage in chat it is possible to prevent color changes due no the correction processing in the remaining regions.

Figure 5:
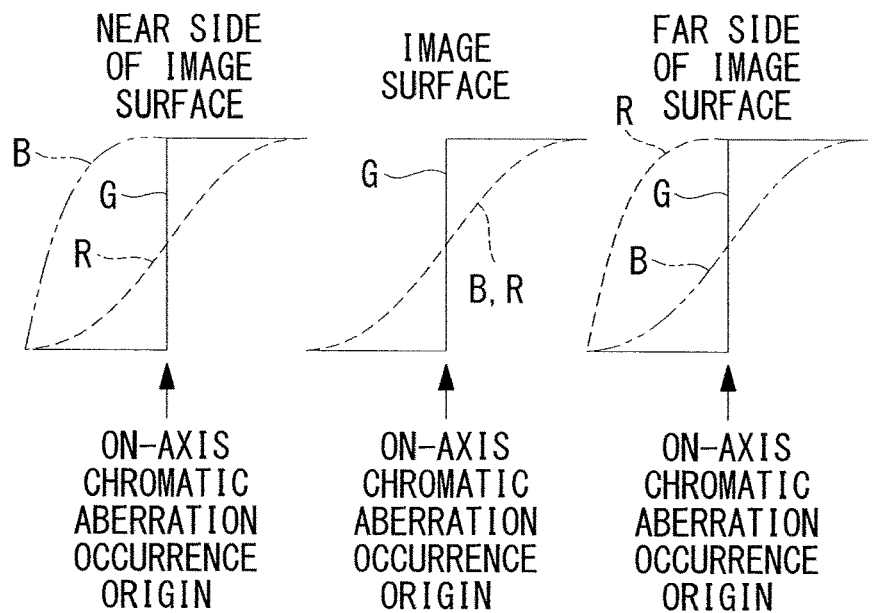
FIG. 5 is a diagram showing a first example of a step edge in the case in which on-axis chromatic aberration occurs in a form differing from that in FIG. 2.
Figure 6:
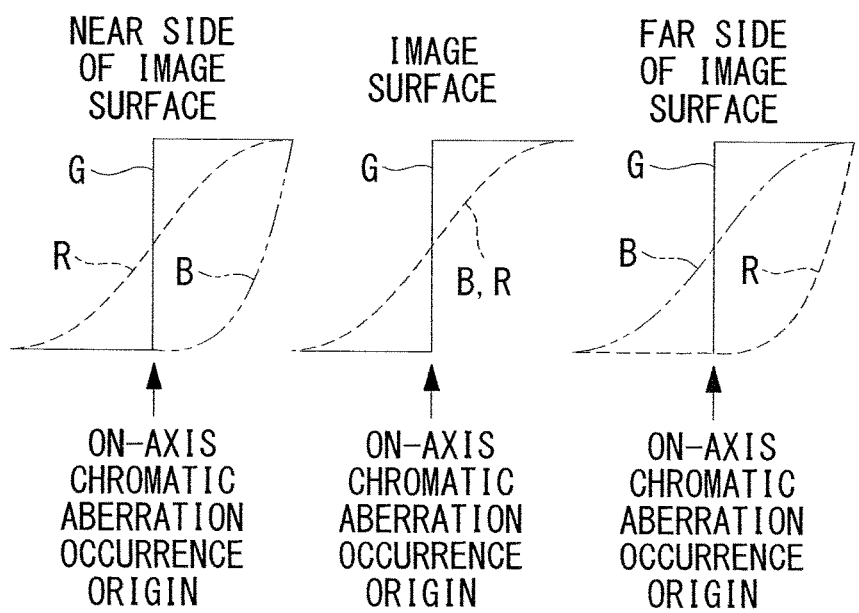
FIG. 6 is a diagram showing a second example of a step edge in the case in which on-axis chromatic aberration occurs in a form differing from that in FIG. 2.

Note that, in the image-processing apparatus 1 according to this embodiment, although it is assumed that the occurrence origins of on-axis chromatic aberrations are detected when all of conditional expressions (1) to (4) are satisfied, alternatively, as shown in FIGS. 5 and 6, a pixel-of-interest may be detected as an occurrence origin of on-axis chromatic aberration when conditional expressions (1) and (2) are satisfied or when conditional expressions (3) and (4) are satisfied.

By doing so, there is an advantage in that it is possible to detect the occurrence origins of on-axis chromatic aberrations in a depth range that covers a larger distance than the focus positions.

In addition, a pixel-of-interest may be detected as an occurrence origin of on-axis chromatic aberration when all of conditional expressions (1), (2), and (4) are satisfied or when all of conditional expressions (2), (3), and (4) are satisfied.

By doing so, a purple fringe is generated in the second direction D2, and it is possible to detect, as an occurrence origin of on-axis chromatic aberration, a location at which the purple fringe is conspicuous because the sum of the R pixel values or the B pixel values in the first direction D1 is less than the sum of the G pixel values, which makes the color thereof close to an antagonistic color in the color wheel.

In addition, a pixel-of-interest may be detected as an occurrence origin of on-axis chromatic aberration when all of conditional expressions (1), (2), and (3) are satisfied or when all of conditional expressions (1), (3), and (4) are satisfied.

By doing so, a green fringe is generated in the first direction D1, and it is possible to detect, as an occurrence origin of on-axis chromatic aberration, a location at which the green fringe is conspicuous because the sum of the R pixel values or the B pixel values in the second direction D2 is greater than the sum of the G pixel values, which makes the color thereof close to an antagonistic color in the color wheel.

In addition, a pixel-of-interest may be detected as an occurrence origin of on-axis chromatic aberration when the sums of the pixel values calculated by using Eq. 1 satisfy all of conditional expressions (5) to (8) below:

$$Pg_{D1}+TH_{R1}>Pr_{D1} \quad (5);$$

$$Pg_{D2}-TH_{R2}<Pr_{D2} \quad (6);$$

$$Pg_{D1}+TH_{B1}>Pb_{D1} \quad (7); \text{ and}$$

$$Pg_{D2}-TH_{B2}<Pb_{D2} \quad (8),$$

where $TH_{R1}$, $TH_{R2}$, $TH_{B1}$, $TH_{B2}$ are arbitrary constants.

Figure 7:
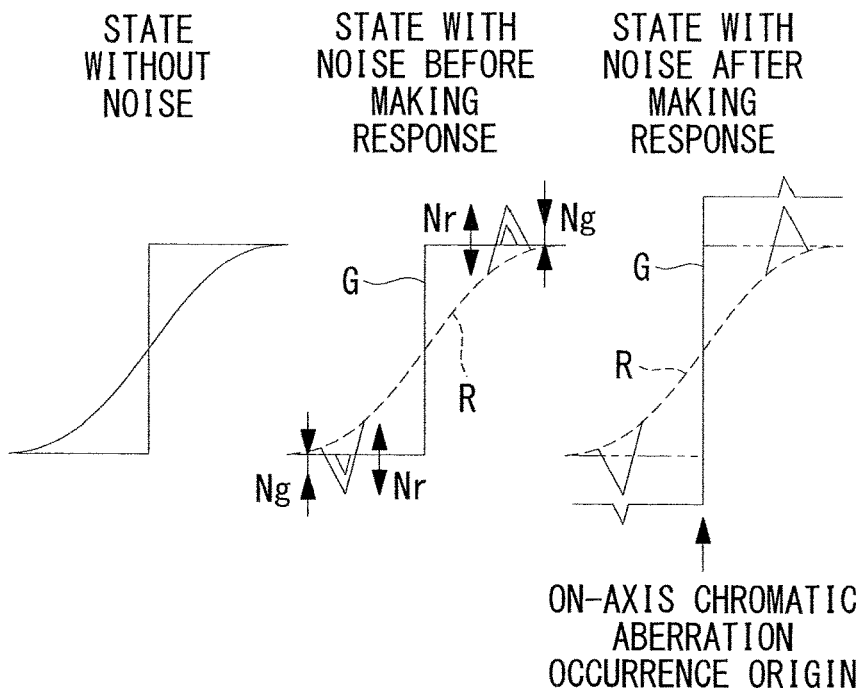
FIG. 7 is a diagram showing a response example in the case in which image signals contain noise in comparison with a case in which there is no noise and a state before the response.

As shown in FIG. 7, a difference between standard deviations indicating G and R noise levels at the position of a pixel to be processed or a difference between standard deviations indicating G and B noise levels thereat can be indicated as examples of $TH_{R1}$, $TH_{R2}$, $TH_{B1}$, and $TH_{B2}$. When R, G, and B noise levels in the first direction D1 and the second direction D2 are assumed to be $Nr_{D1}$, $Ng_{D1}$, $Nb_{D1}$, $Nr_{D2}$, $Ng_{D2}$, and $Nb_{D2}$, respectively, $$TH_{R1}=Nr_{D1}-Ng_{D1},$$

$$TH_{R2}=Nr_{D2}-Ng_{D2},$$

$$TH_{B1}=Nb_{D1}-Ng_{D1}, \text{ and}$$

$$TH_{B2}=Nb_{D2}-Ng_{D2}$$

are obtained.

By doing so, there is an advantage in that it is possible to stably detect an occurrence origin of on-axis chromatic aberration by reducing the influence of noise.

In addition, a pixel-of-interest may be detected as an occurrence origin of on-axis chromatic aberration when the sums of the pixel values calculated by using Eq. 1 satisfy all of conditional expressions (9) to (12) below:

$$Pg_{D1}+TH_R>Pr_{D1} \quad (9);$$

$$Pg_{D2}+TH_R<Pr_{D2} \quad (10);$$

$$Pg_{D1}+TH_B>Pb_{D1} \quad (11); \text{ and}$$

$$Pg_{D2}+TH_B<Pb_{D2} \quad (12),$$

where $TH_R$ and $TH_B$ are arbitrary constants.

Figure 8:
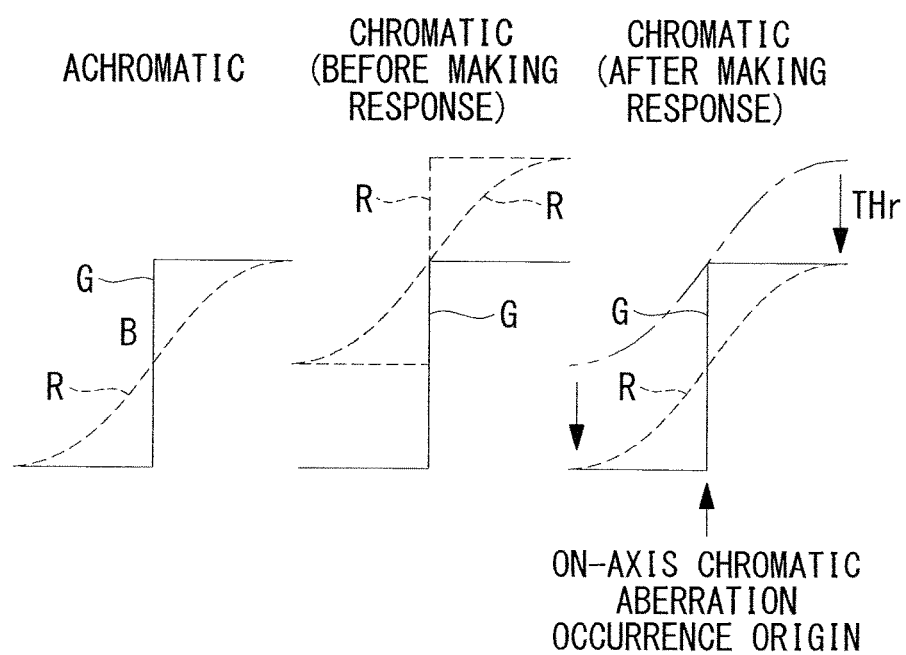
FIG. 8 is a diagram showing a response example in the case in which a chromatic step edge is involved in comparison with an achromatic case and a state before the response.

As shown in FIG. 8, a difference between the G and R pixel values at the position of a pixel to be processed or a difference between the G and B pixel values thereat can be indicated as examples of the constants $TH_R$ and $TH_B$. When the R, G, and B pixel values of the pixel-of-interest are assumed to be $Pr(0,0)$, $Pg(0,0)$, and $Pb(0,0)$, respectively, $$TH_R=Pg(0,0)-Pr(0,0) \text{ and}$$

$$TH_B=Pg(0,0)-Pb(0,0)$$

are obtained.

By doing so, there is an advantage in that it is possible to detect an occurrence origin of on-axis chromatic aberration that has occurred on a color imaging subject instead of an achromatic imaging subject.

In addition, a pixel-of-interest nay be detected as an occurrence origin of on-axis chromatic aberration when the sums of the pixel values calculated by using Eq. 1 satisfy all of conditional expressions (13) to (16) below:

$$Pg_{D1}>Pr_{D1} \times K_R \quad (13);$$

$$Pg_{D2}<Pr_{D2} \times K_R \quad (14);$$

$$Pg_{D1}>Pb_{D1} \times K_B \quad (1); \text{ and}$$

$$Pg_{D2}<Pb_{D2} \times K_B \quad (16),$$

where $K_R$ and $K_B$ are arbitrary constants.

Figure 9:
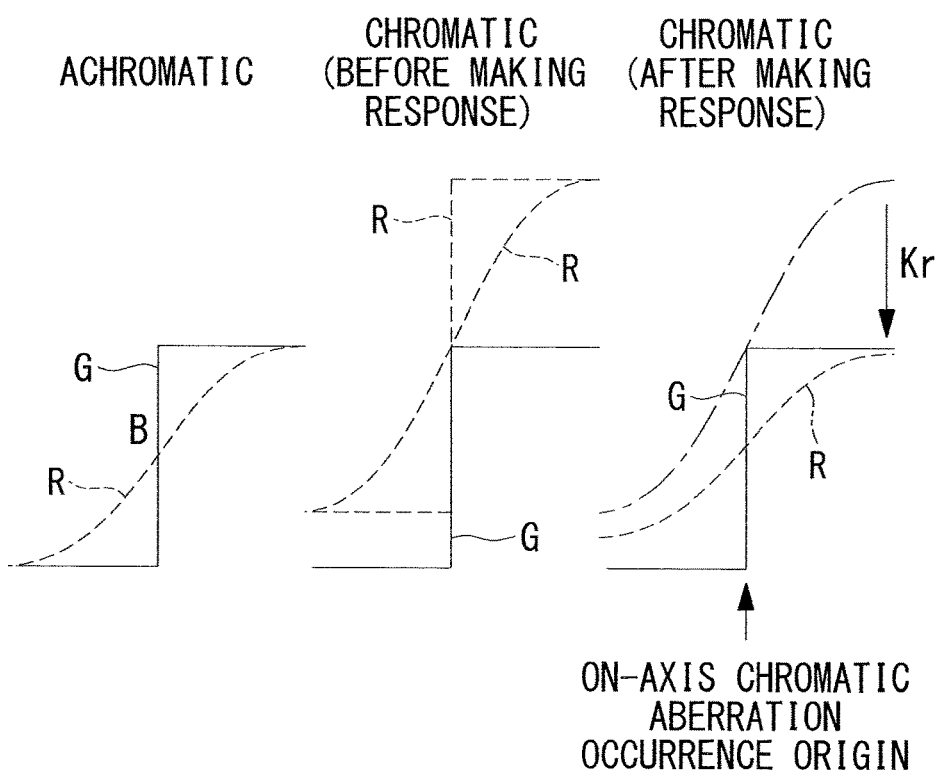
FIG. 9 is a diagram showing another response example in the case in which the chromatic step edge is involved in comparison with the achromatic case and the state before the response.

As shown in FIG. 9, ratios of the G and R pixel values at the position of a pixel to be processed or ratios of the G and B pixel values thereat can be indicated as examples of the constants $K_R$ and $K_B$. When the R, G, and B pixel values of the pixel-of-interest are assumed to be $Pr(0,0)$, $Pg(0,0)$, and $Pb(0,0)$, respectively, $$K_R=Pg(0,0)/Pr(0,0) \text{ and}$$

$$K_B=Pg(0,0)/Pb(0,0)$$

are obtained.

By doing so also, there is an advantage in that it is possible to detect an occurrence origin of on-axis chromatic aberration that has occurred on a color imaging subject instead of an achromatic imaging subject.

In addition, although this embodiment has been described in terms of an example in which a full-color image in which all of the R, G, and B signal values are obtained in the individual pixels is used as the input image, alternatively, the present invention may be applied to a case in which the input image is a so-called Bayer image. In this case, a method of calculating the sums of the pixel values in the first direction D1 by using the total-pixel-value calculating portion 4 is as indicated by Eqs. 2 to 4.

Figure 10A:
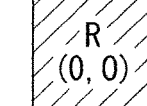
FIG. 10A is a diagram showing a pixel array in the case in which R in an image that is acquired by using an image-acquisition element and that has pixels therein in a Bayer array are set to be pixels-of-interest.

As shown in FIG. 10A, when the pixel-of-interest is an R pixel (shaded portion), the sums of the pixel values are calculated by using mathematical expressions indicated by Egs. 2 and 3.

$$P_{rL} = \sum_{i=1}^{m} P(-2i, 0), \quad \{\text{Eq. 2}\}$$

$$P_{gL} = \left\{\sum_{i=1}^{m} P(-(2i-1), 0) + \sum_{i=1}^{m} P(-2i, -1) + \sum_{i=1}^{m} P(-2i, 1)\right\}/3,$$

$$P_{bL} = \left\{\sum_{i=1}^{m} P(-(2i-1), -1) + \sum_{i=1}^{m} P(-(2i-1), 1)\right\}/2$$

$$P_{rR} = \sum_{i=1}^{m} P(2i, 0),$$

$$P_{gR} = \left\{\sum_{i=1}^{m} P((2i-1), 0) + \sum_{i=1}^{m} P(2i, -1) + \sum_{i=1}^{m} P(2i, 1)\right\}/3,$$

$$P_{bR} = \left\{\sum_{i=1}^{m} P((2i-1), -1) + \sum_{i=1}^{m} P((2i-1), 1)\right\}/2$$

$$P_{rT} = \sum_{i=1}^{m} P(0, -2i),$$

$$P_{gT} = \left\{\sum_{i=1}^{m} P(0, -(2i-1)) + \sum_{i=1}^{m} P(1, -2i) + \sum_{i=1}^{m} P(-1, -2i)\right\}/3,$$

$$P_{bT} = \left\{\sum_{i=1}^{m} P(-1, -(2i-1)) + \sum_{i=1}^{m} P(1, -(2i-1))\right\}/2$$

$$P_{rB} = \sum_{i=1}^{m} P(0, 2i),$$

$$P_{gB} = \left\{\sum_{i=1}^{m} P(0, (2i-1)) + \sum_{i=1}^{m} P(1, 2i) + \sum_{i=1}^{m} P(-1, 2i)\right\}/3,$$

$$P_{bB} = \left\{\sum_{i=1}^{m} P(-1, (2i-1)) + \sum_{i=1}^{m} P(1, (2i-1))\right\}/2$$

-continued $$P_{rLT} = \sum_{i=1}^{m} P(-2i, -2i), \quad \{Eq. 3\}$$

$$P_{gLT} = \left\{\sum_{i=1}^{m} P(-i, -(i-1)) + \sum_{i=1}^{m} P(-(i-1), -i)\right\}/2,$$

$$P_{bLT} = \sum_{i=1}^{m} P(-(2i-1), -(2i-1))$$

$$P_{rLB} = \sum_{i=1}^{m} P(-2i, 2i),$$

$$P_{gLB} = \left\{\sum_{i=1}^{m} P(-i, (i-1)) + \sum_{i=1}^{M} P(-(i-1), i)\right\}/2,$$

$$P_{bLB} = \sum_{i=1}^{m} P(-(2i-1), (2i-1))$$

$$P_{rRT} = \sum_{i=1}^{m} P(2i, -2i),$$

$$P_{gRT} = \left\{\sum_{i=1}^{m} P(i, -(i-1)) + \sum_{i=1}^{M} P((i-1), -i)\right\}/2,$$

$$P_{bRT} = \sum_{i=1}^{m} P((2i-1), -(2i-1))$$

$$P_{rRB} = \sum_{i=1}^{m} P(2i, 2i),$$

$$P_{gRB} = \left\{\sum_{i=1}^{m} P(i, (i-1)) + \sum_{i=1}^{M} P((i-1), -i)\right\}/2,$$

$$P_{bRB} = \sum_{i=1}^{m} P((2i-1), (2i-1))$$

Figure 10B:
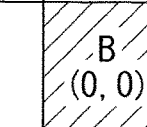
FIG. 10B is a diagram showing a pixel array in the case in which B in an image that is acquired by using an image-acquisition element and that has pixels therein in a Bayer array are set to be pixels-of-interest.

As shown in FIG. 10B, when the pixel-of-interest is a B pixel (shaded portion), the sums of the pixel values are calculated by using mathematical expressions indicated by Eqs. 4 and 5.

$$P_{rL} = \left\{\sum_{i=1}^{m} P(-(2i-1), -1) + \sum_{i=1}^{m} P(-(2i-1), 1)\right\}/2, \quad \{Eq. 4\}$$

$$P_{gL} = \left\{\sum_{i=1}^{m} P(-(2i-1), 0) + \sum_{i=1}^{m} P(-2i, -1) + \sum_{i=1}^{m} P(-2i, 1)\right\}/3,$$

$$P_{bL} = \sum_{i=1}^{m} P(-2i, 0)$$

$$P_{rR} = \left\{\sum_{i=1}^{m} P((2i-1), -1) + \sum_{i=1}^{m} P((2i-1), 1)\right\}/2,$$

$$P_{gR} = \left\{\sum_{i=1}^{m} P((2i-1), 0) + \sum_{i=1}^{m} P(2i, -1) + \sum_{i=1}^{m} P(2i, 1)\right\}/3,$$

$$P_{bR} = \sum_{i=1}^{m} P(2i, 0)$$

$$P_{rT} = \left\{\sum_{i=1}^{m} P(-1, -(2i-1)) + \sum_{i=1}^{m} P(1, -(2i-1))\right\}/2,$$

$$P_{gT} = \left\{\sum_{i=1}^{m} P(0, -(2i-1)) + \sum_{i=1}^{m} P(1, -2i) + \sum_{i=1}^{m} P(-1, -2i)\right\}/3,$$

$$P_{bT} = \sum_{i=1}^{m} P(0, -2i)$$

$$P_{rB} = \left\{\sum_{i=1}^{m} P(-1, (2i-1)) + \sum_{i=1}^{m} P(1, (2i-1))\right\}/2,$$

$$P_{gB} = \left\{\sum_{i=1}^{m} P(0, (2i-1)) + \sum_{i=1}^{m} P(1, 2i) + \sum_{i=1}^{m} P(-1, 2i)\right\}/3,$$

$$P_{bB} = \sum_{i=1}^{m} P(0, 2i)$$

$$P_{rLT} = \sum_{i=1}^{m} P(-(2i-1), -(2i-1)), \quad \{Eq. 5\}$$

$$P_{gLT} = \left\{\sum_{i=1}^{m} P(-i, -(i-1)) + \sum_{i=1}^{m} P(-(i-1), -i)\right\}/2,$$

$$P_{bLT} = \sum_{i=1}^{m} P(-2i, -2i)$$

$$P_{rLB} = \sum_{i=1}^{m} P(-(2i-1), (2i-1)),$$

$$P_{gLB} = \left\{\sum_{i=1}^{m} P(-i, (i-1)) + \sum_{i=1}^{m} P(-(i-1), i)\right\}/2,$$

$$P_{bLB} = \sum_{i=1}^{m} P(-2i, 2i)$$

$$P_{rRT} = \sum_{i=1}^{m} P((2i-1), -(2i-1)),$$

$$P_{gRT} = \left\{\sum_{i=1}^{m} P(i, -(i-1)) + \sum_{i=1}^{m} P((i-1), -i)\right\}/2,$$

$$P_{bRT} = \sum_{i=1}^{m} P(2i, -2i)$$

$$P_{rRB} = \sum_{i=1}^{m} P((2i-1), (2i-1)),$$

$$P_{gRB} = \left\{\sum_{i=1}^{m} P(i, (i-1)) + \sum_{i=1}^{m} P((i-1), i)\right\}/2,$$

$$P_{bRB} = \sum_{i=1}^{m} P(2i, 2i)$$

As shown in FIG. 10C, when the pixel-of-interest is a GR pixel (shaded portion), the sums of the pixel values are calculated by using mathematical expressions indicated by Eqs. 6 and 7.

$$P_{rL} = \sum_{i=1}^{m} P(-(2i-1), 0), \quad \{Eq. 6\}$$

-continued $$P_{gL} = \left\{\sum_{i=1}^{m} P(-2i, 0) + \sum_{i=1}^{m} P(-(2i-1), -1) + \sum_{i=1}^{m} P(-(2i-1), 1)\right\}/3,$$

$$P_{bL} = \left\{\sum_{i=1}^{m} P(-2i, -1) + \sum_{i=1}^{m} P(-2i, 1)\right\}/2$$

$$P_{rR} = \sum_{i=1}^{m} P((2i-1), 0),$$

$$P_{gR} = \left\{\sum_{i=1}^{m} P(2i, 0) + \sum_{i=1}^{m} P((2i-1), -1) + \sum_{i=1}^{m} P((2i-1), 1)\right\}/3,$$

$$P_{bR} = \left\{\sum_{i=1}^{m} P(2i, -1) + \sum_{i=1}^{m} P(2i, 1)\right\}/2$$

$$P_{rT} = \left\{\sum_{i=1}^{m} P(-1, -2i) + \sum_{i=1}^{m} P(1, -2i)\right\}/2,$$

$$P_{gT} = \left\{\sum_{i=1}^{m} P(0, -2i) + \sum_{i=1}^{m} P(1, -(2i-1)) + \sum_{i=1}^{m} P(-1, -(2i-1))\right\}/3,$$

$$P_{bT} = \sum_{i=1}^{m} P(0, -(2i-1))$$

$$P_{rB} = \left\{\sum_{i=1}^{m} P(-1, 2i) + \sum_{i=1}^{m} P(1, 2i)\right\}/2,$$

$$P_{gB} = \left\{\sum_{i=1}^{m} P(0, 2i) + \sum_{i=1}^{m} P(1, (2i-1)) + \sum_{i=1}^{m} P(-1, (2i-1))\right\}/3,$$

$$P_{bB} = \sum_{i=1}^{m} P(0, (2i-1))$$

$$P_{rLT} = \left\{\sum_{i=1}^{m} P(-(2i-1), -2(i-1)) + \sum_{i=1}^{m} P(-(2i-1), -2i)\right\}/2, \quad \{\text{Eq. 7}\}$$

$$P_{gLT} = \sum_{i=1}^{m} P(-i, -i),$$

$$P_{bLT} = \left\{\sum_{i=1}^{m} P(-2i, -(2i-1)) + \sum_{i=1}^{m} P(-2(i-1), -(2i-1))\right\}/2$$

$$P_{rLB} = \left\{\sum_{i=1}^{m} P(-(2i-1), 2(i-1)) + \sum_{i=1}^{m} P(-(2i-1), 2i)\right\}/2,$$

$$P_{gLB} = \sum_{i=1}^{m} P(-i, i),$$

$$P_{bLB} = \left\{\sum_{i=1}^{m} P(-2i, (2i-1)) + \sum_{i=1}^{m} P(-2(i-1), (2i-1))\right\}/2$$

$$P_{rRT} = \left\{\sum_{i=1}^{m} P((2i-1), -2(i-1)) + \sum_{i=1}^{m} P((2i-1), -2i)\right\}/2,$$

$$P_{gRT} = \sum_{i=1}^{m} P(i, -i),$$

$$P_{bRT} = \left\{\sum_{i=1}^{m} P(2i, -(2i-1)) + \sum_{i=1}^{m} P(2(i-1), -(2i-1))\right\}/2$$

$$P_{rRB} = \left\{\sum_{i=1}^{m} P((2i-1), 2(i-1)) + \sum_{i=1}^{m} P((2i-1), 2i)\right\}/2,$$

$$P_{gRB} = \sum_{i=1}^{m} P(i, i),$$

$$P_{bRB} = \left\{\sum_{i=1}^{m} P(2i, (2i-1)) + \sum_{i=1}^{m} P(2(i-1), (2i-1))\right\}/2$$

Figure 10D:
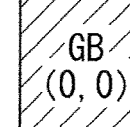
FIG. 10D is a diagram showing a pixel array in the case in which GB in an image that is acquired by using an image-acquisition element and that has pixels therein in a Bayer array are set to be pixels-of-interest.

As shown in FIG. 10D, when the pixel-of-interest is a GB pixel (shaded portion), the sums of the pixel values are calculated by using mathematical expressions indicated by Eqs. 8 and 9.

$$P_{rL} = \left\{\sum_{i=1}^{m} P(-2i, -1) + \sum_{i=1}^{m} P(-2i, 1)\right\}/2, \quad \{\text{Eq. 8}\}$$

$$P_{gL} = \left\{\sum_{i=1}^{m} P(-2i, 0) + \sum_{i=1}^{m} P(-(2i-1), -1) + \sum_{i=1}^{m} P(-(2i-1), 1)\right\}/3,$$

$$P_{bL} = \sum_{i=1}^{m} P(-(2i-1), 0)$$

$$P_{rR} = \left\{\sum_{i=1}^{m} P(2i, -1) + \sum_{i=1}^{m} P(2i, 1)\right\}/2,$$

$$P_{gR} = \left\{\sum_{i=1}^{m} P(2i, 0) + \sum_{i=1}^{m} P((2i-1), -1) + \sum_{i=1}^{m} P((2i-1), 1)\right\}/3,$$

$$P_{bR} = \sum_{i=1}^{m} P((2i-1), 0)$$

$$P_{rT} = \sum_{i=1}^{m} P(0, -(2i-1)),$$

$$P_{gT} = \left\{\sum_{i=1}^{m} P(0, -2i) + \sum_{i=1}^{m} P(1, -(2i-1)) + \sum_{i=1}^{m} P(-1, -(2i-1))\right\}/3,$$

$$P_{bT} = \left\{\sum_{i=1}^{m} P(-1, -2i) + \sum_{i=1}^{m} P(1, -2i)\right\}/2$$

$$P_{rB} = \sum_{i=1}^{m} P(0, (2i-1)),$$

$$P_{gB} = \left\{\sum_{i=1}^{m} P(0, 2i) + \sum_{i=1}^{m} P(1, (2i-1)) + \sum_{i=1}^{m} P(-1, (2i-1))\right\}/3,$$

$$P_{bB} = \left\{\sum_{i=1}^{m} P(-1, 2i) + \sum_{i=1}^{m} P(1, 2i)\right\}/2$$

$$P_{rLT} = \left\{\sum_{i=1}^{m} P(-2i, -(2i-1)) + \sum_{i=1}^{m} P(-2(i-1), -(2i-1))\right\}/2, \quad \{\text{Eq. 9}\}$$

$$P_{gLT} = \sum_{i=1}^{m} P(-i, -i),$$

$$P_{bLT} = \left\{\sum_{i=1}^{m} P(-(2i-1), -2(i-1)) + \sum_{i=1}^{m} P(-(2i-1), -2i)\right\}/2$$

-continued $$P_{rLB} = \left\{ \sum_{i=1}^{m} P(-2i, (2i-1)) + \sum_{i=1}^{m} P(-2(i-1), (2i-1)) \right\} / 2,$$

$$P_{gLB} = \sum_{i=1}^{m} P(-i, i),$$

$$P_{bLB} = \left\{ \sum_{i=1}^{m} P(-(2i-1), 2(i-1)) + \sum_{i=1}^{m} P(-(2i-1), 2i) \right\} / 2$$

$$P_{rRT} = \left\{ \sum_{i=1}^{m} P(2i, -(2i-1)) + \sum_{i=1}^{m} P(2(i-1), -(2i-1)) \right\} / 2,$$

$$P_{gRT} = \sum_{i=1}^{m} P(i, -i),$$

$$P_{bRT} = \left\{ \sum_{i=1}^{m} P((2i-1), -2(i-1)) + \sum_{i=1}^{m} P((2i-1), -2i) \right\} / 2$$

$$P_{rRB} = \left\{ \sum_{i=1}^{m} P(2i, (2i-1)) + \sum_{i=1}^{m} P(2(i-1), (2i-1)) \right\} / 2,$$

$$P_{gRB} = \sum_{i=1}^{m} P(i, i),$$

$$P_{bRB} = \left\{ \sum_{i=1}^{m} P((2i-1), 2(i-1)) + \sum_{i=1}^{m} P((2i-1), 2i) \right\} / 2$$

By doing so, it is possible to detect an occurrence origin of on-axis chromatic aberration even in an image that has not been subjected to synchronization, and thus, it is possible, when performing detection, to eliminate the influence of interpolation errors caused by synchronization.

The image-processing apparatus 1 according to this embodiment is used by being installed in products such as a broadcasting still camera, an ENG camera, a consumer-level portable camera, a digital camera, and so forth. In addition, the present invention can be employed in an image-signal correction program (CG program), an image editing apparatus, or the like for handling video images. In addition, the present invention may be employed as an image-processing program that causes a computer (for example, personal computer) to execute the image-processing method according to this embodiment.

As a result, the above-described embodiment lead to the following aspects.

An aspect of the present invention is an image-processing apparatus including: a total-pixel-value calculating portion that separately calculates, for each color, sums of pixel values of pixels that are arrayed in a first direction and a second direction on either side of a pixel-of-interest in an image; and an occurrence-origin detecting portion that detects the pixel-of-interest as an occurrence origin of on-axis chromatic aberration in the case in which a magnitude relationship between the sum of G pixel values and that of R pixel values of the pixels that are arrayed in the first direction, which are calculated by the total-pixel-value calculating portion, is inverted with respect to a magnitude relationship between the sum of G pixel values and that of R pixel values of the pixels that are arrayed in the second direction or in the case in which a magnitude relationship between the sum of the G pixel values and that of B pixel values of the pixels that are arrayed in the first direction is inverted with respect to a magnitude relationship between the sum of the G pixel values and that of B pixel values of the pixels that are arrayed in the second direction.

With this aspect, the total-pixel-value calculating portion separately calculates the pixel values of the pixels that are arrayed in straight lines on either side of the pixel-of-interest, and the occurrence-origin detecting portion detects the pixel-of-interest as the occurrence origin of on-axis chromatic aberration when, in the calculated sums of the pixel values, the sum of the G pixel values is greater in one of the two directions and the sum of the R or B pixel values is greater in the other direction. By doing so, it is possible to detect a pixel that is not part of a near-saturated region as an occurrence origin of on-axis chromatic aberration.

The above-described aspect may be provided with a region determining portion that determines, as an on-axis-chromatic-aberration region, a predetermined peripheral region that has the occurrence origin of the on-axis chromatic aberration detected by the occurrence-origin detecting portion as an origin thereof.

By doing so, it is possible to set a pixel that is not part of a near-saturated region as an occurrence origin and to set an on-axis-chromatic-aberration region in an area surrounding the pixel.

In addition, the above-described aspect may be provided with a correction portion that corrects the on-axis-chromatic-aberration region determined by the region determining portion.

By doing so, it is possible to perform the correction processing only on the region in which on-axis chromatic aberration occurs, and thus, it is possible to prevent a color change due to the correction processing in the remaining regions.

In addition, in the above-described aspect, the occurrence-origin detecting portion may determine the pixel-of-interest to be an occurrence origin of on-axis chromatic aberration when the conditional expressions below are satisfied:

$$Pg_{D1} > Pr_{D1}; \text{ and}$$

$$Pg_{D2} < Pr_{D2},$$

where $Pg_{D1}$ is the sum of the P pixel values of the pixels that are arrayed in the first direction from the pixel-of-interest; $Pg_{D2}$ is the sum of the G pixel values of the pixels that are arrayed in the second direction from toe pixel-of-interest; $Pr_{D1}$ is the sum of the R pixel values of the pixels that are arrayed in the first direction from the pixel-of-interest; and $Pr_{D2}$ is the sum of the R pixel values of the pixels that are arrayed in the second direction from the pixel-of-interest.

By doing so, it is possible to detect an occurrence origin of on-axis chromatic aberration in the vicinity of a focus position.

In addition, in the above-described aspect, the occurrence-origin detecting portion may determine the pixel-of-interest to be an occurrence origin of on-axis chromatic aberration when the conditional expressions below are satisfied:

$$Pg_{D1} > Pb_{D1}; \text{ and}$$

$$Pg_{D2} < Pb_{D2},$$

where $Pg_{D1}$ is the sum of the G pixel values of the pixels that are arrayed in the first direction from the pixel-of-interest; $Pg_{D2}$ is the sum of the G pixel values of the pixels that are arrayed in the second direction from the pixel-of-interest; $Pb_{D1}$ is the sum of the B pixel values of the pixels that are arrayed in the first direction from the pixel-of-interest; and $Pb_{D2}$ is the sum of the B pixel values of the pixels that are arrayed in the second direction from the pixel-of-interest.

By doing so also, it is possible to detect an occurrence origin of on-axis chromatic aberration in the vicinity of a focus position.

In addition, in the above-described aspect, the occurrence-origin detecting portion may determine the pixel-of-interest to be an occurrence origin of on-axis chromatic aberration when the conditional expressions below are satisfied:

$$Pg_{D1} > Pr_{D1};$$

$$Pg_{D2} < Pr_{D2}; \text{ and}$$

$$Pg_{D2} < Pb_{D2},$$

where $Pg_{D1}$ is the sum of the G pixel values of the pixels that are arrayed in the first direction from the pixel-of-interest; $Pg_{D2}$ is the sum of the G pixel values of the pixels that are arrayed in the second direction from the pixel-of-interest; $Pr_{D1}$ is the sum of the R pixel values of the pixels that are arrayed in the first direction from the pixel-of-interest; $Pr_{D2}$ is the sum of the R pixel values of the pixels that are arrayed in the second direction from the pixel-of-interest; and $Pb_{D2}$ is the sum of the B pixel values of the pixels that are arrayed in the second direction from the pixel-of-interest.

By doing so, a purple fringe is generated in the second direction, and it is possible to detect, as an occurrence origin of on-axis chromatic aberration, a location at which the purple fringe is conspicuous because the sum of the R pixel values in the first direction is less than the sum of the G pixel values, which makes the color thereof close to an antagonistic color in the color wheel.

In addition, in the above-described aspect, the occurrence-origin detecting portion may determine the pixel-of-interest to be an occurrence origin of on-axis chromatic aberration when the conditional expressions below are satisfied:

$$Pg_{D1} > Pb_{D1};$$

$$Pg_{D2} < Pr_{D2}; \text{ and}$$

$$Pg_{D2} < Pb_{D2},$$

where $Pg_{D1}$ is the sum of the G pixel values of the pixels that are arrayed in the first direction from the pixel-of-interest; $Pg_{D2}$ is the sum of the G pixel values of the pixels that are arrayed in the second direction from the pixel-of-interest; $Pr_{D2}$ is the sum of the R pixel values of the pixels that are arrayed in the second direction from the pixel-of-interest; $Pb_{D1}$ is the sum of the B pixel values of the pixels that are arrayed in the first direction from the pixel-of-interest; and $Pb_{D2}$ is the sum of the B pixel values of the pixels that are arrayed in the second direction from the pixel-of-interest.

By doing so also, a purple fringe is generated in the second direction, and it is possible to detect, as an occurrence origin of on-axis chromatic aberration, a location at which the purple fringe is conspicuous because the sum of the B pixel values in the first direction is less than the sum of the G pixel values, which makes the color thereof close to an antagonistic color in the color wheel.

In addition, in the above-described aspect, the occurrence-origin detecting portion may determine the pixel-of-interest to be an occurrence origin of on-axis chromatic aberration when the conditional expressions below are satisfied:

$$Pg_{D1} > Pr_{D1};$$

$$Pg_{D1} > Pb_{D1}; \text{ and}$$

$$Pg_{D2} < Pr_{D2},$$

where $Pg_{D1}$ is the sum of the G pixel values of the pixels that are arrayed in the first direction from the pixel-of-interest; $Pg_{D2}$ is the sum of the G pixel values of the pixels that are arrayed in the second direction from the pixel-of-interest; $Pr_{D1}$ is the sum of the R pixel values of the pixels that are arrayed in the first direction from the pixel-of-interest; $Pr_{D2}$ is the sum of the R pixel values of the pixels that are arrayed in the second direction from the pixel-of-interest; and $Pb_{D1}$ is the sum of the B pixel values of the pixels that are arrayed in the first direction from the pixel-of-interest.

By doing so, a green fringe is generated in the first direction, and it is possible to detect, as an occurrence origin of on-axis chromatic aberration, a location at which the green fringe is conspicuous because the sum of the R pixel values in the second direction is greater than the sum of the G pixel values, which makes the color thereof close to an antagonistic color in the color wheel.

In addition, in the above-described aspect, the occurrence-origin detecting portion may determine the pixel-of-interest to be an occurrence origin of on-axis chromatic aberration when the conditional expressions below are satisfied:

$$Pg_{D1} > Pr_{D1};$$

$$Pg_{D1} > Pb_{D1}; \text{ and}$$

$$Pg_{D2} < Pb_{D2},$$

where $Pg_{D1}$ is the sum of the G pixel values of the pixels that are arrayed in the first direction from the pixel-of-interest; $Pg_{D2}$ is the sum of the G pixel values of the pixels that are arrayed in the second direction from the pixel-of-interest; $Pr_{D1}$ is the sum of the R pixel values of the pixels that are arrayed in the first direction from the pixel-of-interest; $Pb_{D1}$ is the sum of the B pixel values of the pixels that are arrayed in the first direction from the pixel-of-interest; and $Pb_{D2}$ is the sum of the B pixel values of the pixels that are arrayed in the second direction from the pixel-of-interest.

By doing so also, a green fringe is generated in the first direction, and it is possible to detect, as an occurrence origin of on-axis chromatic aberration, a location at which the green fringe is conspicuous because the sum of the B pixel values in the second direction is greater than the sum of the G pixel values, which makes the color thereof close to an antagonistic color in the color wheel.

In addition, in the above-described aspect, the occurrence-origin detecting portion may determine the pixel-of-interest to be an occurrence origin of on-axis chromatic aberration when the conditional expressions below are satisfied:

$$Pg_{D1} + TH_{R1} > Pr_{D1};$$

$$Pg_{D2} - TH_{R2} < Pr_{D2};$$

$$Pg_{D1} + TH_{B1} > Pb_{D1}; \text{ and}$$

$$Pg_{D2} - TH_{B2} < Pb_{D2},$$

where $Pg_{D1}$ is the sum of the G pixel values of the pixels that are arrayed in the first direction from the pixel-of-interest; $Pg_{D2}$ is the sum of the G pixel values of the pixels that are arrayed in the second direction from the pixel-of-interest; $Pr_{D1}$ is the sum of the R pixel values of the pixels that are arrayed in the first direction from the pixel-of-interest; $Pr_{D2}$ is the sum of the R pixel values of the pixels that are arrayed in the second direction from the pixel-of-interest; $Pb_{D1}$ is the sum of the B pixel values of the pixels that are arrayed in the first direction from the pixel-of-interest; $Pb_{D2}$ is the sum of the B pixel values of the pixels that are arrayed in the second direction from the pixel-of-interest; and $TH_{R1}$, $TH_{R2}$, $TH_{B1}$, and $TH_{B2}$ are arbitrary constants.

By doing so, by appropriately selecting $TH_{R1}$, $TH_{R2}$, $TH_{B1}$, and $TH^{B2}$ it is possible to stably detect an occurrence origin of on-axis chromatic aberration by reducing the influences of noise.

In addition, in the above-described aspect, the occurrence-origin detecting portion may determine the pixel-of-interest to be an occurrence origin of on-axis chromatic aberration when the conditional expressions below are satisfied:

$$Pg_{D1}+TH_R>Pr_{D1};$$

$$Pg_{D2}+TH_R<Pr_{D2};$$

$$Pg_{D1}+TH_B>Pb_{D1}; \text{ and}$$

$$Pg_{D2}+TH_B<Pb_{D2},$$

where $Pg_{D1}$ is the sum of the G pixel values of the pixels that are arrayed in the first direction from the pixel-of-interest; $Pg_{D2}$ is the sum of the G pixel values of the pixels that are arrayed in the second direct on from the pixel-of-interest; $Pr_{D1}$ is the sum of the R pixel values of the pixels that are arrayed in the first direction from the pixel-of-interest; $Pr_{D2}$ is the sum of the R pixel values of the pixels that are arrayed in the second direction from the pixel-of-interest; $Pb_{D1}$ is the sum of the B pixel values of the pixels that are arrayed in the first direction from the pixel-of-interest; $Pr_{D2}$ is the sum of the B pixel values of the pixels that are arrayed in the second direction from the pixel-of-interest; and $TH_R$ and $TH_B$ are arbitrary constants.

By doing so, by appropriately selecting $TH_R$ and $TH_B$, it is possible to detect an occurrence origin of on-axis chromatic aberration that has occurred on a color imaging subject instead of an achromatic imaging subject.

In addition, in the above-described aspect, the occurrence-origin detecting portion may determine the pixel-of-interest to be an occurrence origin of on-axis chromatic aberration when the conditional expressions below are satisfied:

$$Pg_{D1}>Pr_{D1}\times K_R;$$

$$Pg_{D2}<Pr_{D2}\times K_R;$$

$$Pg_{D1}>Pb_{D1}\times K_B; \text{ and}$$

$$Pg_{D2}<Pb_{D2}\times K_B,$$

where $Pg_{D1}$ is the sum of the G pixel values of the pixels that are arrayed in the first direction from the pixel-of-interest; $Pg_{D2}$ is the sum of the G pixel values of the pixels that are arrayed in the second direction from the pixel-of-interest; $Pr_{D1}$ is the sum of the R pixel values of the pixels that are arrayed in the first direction from the pixel-of-interest; $Pr_{D2}$ is the sum of the R pixel values of the pixels that are arrayed in the second direction from the pixel-of-interest; $Pb_{D1}$ is the sum of the B pixel values of the pixels that are arrayed in the first direction from the pixel-of-interest; $Pb_{D2}$ is the sum of the B pixel values of the pixels that are arrayed in the second direction from the pixel-of-interest; and $K_R$ and $K_B$ are arbitrary constants.

By doing so also, by appropriately selecting $K_R$ and $K_B$, it is possible to detect an occurrence origin of on-axis chromatic aberration that has occurred on a color imaging subject instead of an achromatic imaging subject.

In addition, in the above-described aspect, the image may have all of R, G, and B pixel values in the individual pixels thereof.

By doing so, it is possible to perform the processing for detecting an occurrence origin of on-axis chromatic aberration on an image that has been subjected to synchronization, in which all of R, G, and B pixel values are simultaneously acquired in the individual pixels.

In addition, in the above-described aspect, the image may have pixel values in which at least one of R, G, and B pixel values are missing in the individual pixels.

By doing so, it is possible to detect an occurrence origin of on-axis chromatic aberration on an image that has been not been subjected to synchronization, in which all of R, G, and B pixel values are not simultaneously acquired in the individual pixels, and thus, it is possible, when performing detection, to eliminate the influences of interpolation errors caused by synchronization.

In addition, another aspect of the present invention is an image-processing method including: a total-pixel-value calculating step of separately calculating, for each color, sums of pixel values or pixels that are arrayed in a first direction and a second direction on either side of a pixel-of-interest in an image; and an occurrence-origin detecting step of detecting the pixel-of-interest as an occurrence origin of on-axis chromatic aberration in the case in which a magnitude relationship between the sum of G pixel values and that of R pixel values of the pixels that are arrayed in the first direction, which are calculated in the total-pixel-value calculating step, is inverted with respect to a magnitude relationship between the sum of G pixel values and that of R pixel values of the pixels that are arrayed in the second direction or in the case in which a magnitude relationship between the sum of the G pixel values and that of B pixel values of the pixels that are arrayed in the first direction is inverted with respect to a magnitude relationship between the sum of the G pixel values and that of B pixel values of the pixels that are arrayed in the second direction.

The above-described aspect may include a region determining step of determining, as an on-axis-chromatic-aberration region, a predetermined peripheral region that has the occurrence origin of the on-axis chromatic aberration detected in the occurrence-origin detecting step as an origin thereof.

In addition, the above-described aspect may include a correcting step of correcting the on-axis-chromatic-aberration region determined in the region determining step.

In addition, another aspect of the present invention is an image-processing program that causes a computer to execute a total-pixel-value calculating step of separately calculating, for each color, sums of pixel values of pixels that are arrayed in a first direction and a second direction on either side of a pixel-of-interest in an image; and an occurrence-origin detecting step of detecting the pixel-of-interest as an occurrence origin of on-axis chromatic aberration in the case in which a magnitude relationship between the sum of G pixel values and that of R pixel values of the pixels that are arrayed in the first direction, which are calculated in the total-pixel-value calculating step, is inverted with respect to a magnitude relationship between the sum of G pixel values and that of R pixel values of the pixels that are arrayed in the second direction or in the case in which a magnitude relationship between the sum of the G pixel values and that of B pixel values of the pixels that are arrayed in the first direction is inverted with respect to a magnitude relationship between the sum of the G pixel values and that of B pixel values of the pixels that are arrayed in the second direction.

The above-described aspect may include a region determining step of determining, as an on-axis-chromatic-aberration region, a predetermined peripheral region that has the occurrence origin of the on-axis chromatic aberration detected in the occurrence-origin detecting step as an origin thereof.

In addition, the above-described aspect may include a correcting step of correcting the on-axis-chromatic-aberration region determined in the region determining step.

The present invention affords an advantage in that it is possible to detect on-axis chromatic aberration even in regions other than a near-saturated region and to perform correction thereof in a highly precise manner.

REFERENCE SIGNS LIST 1 image-processing apparatus
3 aberration correction portion correction portion)
4 total-pixel-value calculating portion
5 occurrence-origin detecting portion.
6 region determining portion
S2 total-pixel-value calculating step
S3 occurrence-origin detecting step
S5 region determining step
S7 correcting step

The invention claimed is:

1. An image-processing apparatus comprising:
a hardware processor that includes:
a total-pixel-value calculating portion that separately calculates, for each color, sums of pixel values of pixels that are arrayed in a first direction and a second direction on either side of a pixel-of-interest in an input image;
an occurrence-origin detecting portion that detects the pixel-of-interest as an occurrence origin of on-axis chromatic aberration in the case in which a magnitude relationship between the sum of G pixel values and that of R pixel values of the pixels that are arrayed in the first direction, which are calculated by the total-pixel-value calculating portion, is inverted with respect to a magnitude relationship between the sum of G pixel values and that of R pixel values of the pixels that are arrayed in the second direction or in the case in which a magnitude relationship between the sum of the G pixel values and that of B pixel values of the pixels that are arrayed in the first direction is inverted with respect to a magnitude relationship between the sum of the G pixel values and that of B pixel values of the pixels that are arrayed in the second direction,
a region determining portion that determines, as an on-axis-chromatic-aberration region, a predetermined peripheral region that has the occurrence origin of the on-axis chromatic aberration detected by the occurrence-origin detecting portion as an origin thereof; and
a correction portion that corrects the on-axis-chromatic-aberration region determined by the region determining portion, in the input image, to thereby generate and output a corrected output image in which the on-axis chromatic aberration region has been corrected.

2. An image-processing apparatus according to claim 1, wherein the occurrence-origin detecting portion determines the pixel-of-interest to be an occurrence origin of on-axis chromatic aberration when the conditional expressions below are satisfied:

$$Pg_{D1} > Pr_{D1};\text{ and}$$

$$Pg_{D2} < Pr_{D2},$$

where
$Pg_{D1}$ is the sum of the G pixel values of the pixels that are arrayed in the first direction from the pixel-of-interest;
$Pg_{D2}$ is the sum of the G pixel values of the pixels that are arrayed in the second direction from the pixel-of-interest;
$Pr_{D1}$ is the sum of the R pixel values of the pixels that are arrayed in the first direction from the pixel-of-interest; and
$Pr_{D2}$ is the sum of the R pixel values of the pixels that are arrayed in the second direction from the pixel-of-interest.

3. An image-processing apparatus according to claim 1, wherein the occurrence-origin detecting portion determines the pixel-of-interest to be an occurrence origin of on-axis chromatic aberration when the conditional expressions below are satisfied:

$$Pg_{D1} > Pb_{D1};\text{ and}$$

$$Pg_{D2} < Pb_{D2},$$

where
$Pg_{D1}$ is the sum of the G pixel values of the pixels that are arrayed in the first direction from the pixel-of-interest;
$Pg_{D2}$ is the sum of the G pixel values of the pixels that are arrayed in the second direction from the pixel-of-interest;
$Pb_{D1}$ is the sum of the B pixel values of the pixels that are arrayed in the first direction from the pixel-of-interest; and
$Pb_{D2}$ is the sum of the B pixel values of the pixels that are arrayed in the second direction from the pixel-of-interest.

4. An image-processing apparatus according to claim 1, wherein the occurrence-origin detecting portion determines the pixel-of-interest to be an occurrence origin of on-axis chromatic aberration when the conditional expressions below are satisfied:

$$Pg_{D1} > Pr_{D1};$$

$$Pg_{D2} < Pr_{D2};\text{ and}$$

$$Pg_{D2} < Pb_{D2},$$

where
$Pg_{D1}$ is the sum of the G pixel values of the pixels that are arrayed in the first direction from the pixel-of-interest;
$Pg_{D2}$ is the sum of the G pixel values of the pixels that are arrayed in the second direction from the pixel-of-interest;
$Pr_{D1}$ is the sum of the R pixel values of the pixels that are arrayed in the first direction from the pixel-of-interest;
$Pr_{D2}$ is the sum of the R pixel values of the pixels that are arrayed in the second direction from the pixel-of-interest; and
$Pb_{D2}$ is the sum of the B pixel values of the pixels that are arrayed in the second direction from the pixel-of-interest.

5. An image-processing apparatus according to claim 1, wherein the occurrence-origin detecting portion determines the pixel-of-interest to be an occurrence origin of on-axis chromatic aberration when the conditional expressions below are satisfied:

$$Pg_{D1} > Pb_{D1};$$

$$Pg_{D2} < Pr_{D2};\text{ and}$$

$$Pg_{D2} < Pb_{D2},$$

where $Pg_{D1}$ is the sum of the G pixel values of the pixels that are arrayed in the first direction from the pixel-of-interest;

$Pg_{D2}$ is the sum of the G pixel values of the pixels that are arrayed in the second direction from the pixel-of-interest;

$Pr_{D2}$ is the sum of the R pixel values of the pixels that are arrayed in the second direction from the pixel-of-interest;

$Pb_{D1}$ is the sum of the B pixel values of the pixels that are arrayed in the first direction from the pixel-of-interest; and $Pb_{D2}$ is the sum of the B pixel values of the pixels that are arrayed in the second direction from the pixel-of-interest.

6. An image-processing apparatus according to claim 1, wherein the occurrence-origin detecting portion determines the pixel-of-interest to be an occurrence origin of on-axis chromatic aberration when the conditional expressions below are satisfied:

$$Pg_{D1} > Pr_{D1};$$

$$Pg_{D1} > Pb_{D1};\text{ and}$$

$$Pg_{D2} < Pr_{D2},$$

where $Pg_{D1}$ is the sum of the G pixel values of the pixels that are arrayed in the first direction from the pixel-of-interest;

$Pg_{D2}$ is the sum of the G pixel values of the pixels that are arrayed in the second direction from the pixel-of-interest;

$Pr_{D1}$ is the sum of the R pixel values of the pixels that are arrayed in the first direction from the pixel-of-interest;

$Pr_{D2}$ is the sum of the R pixel values of the pixels that are arrayed in the second direction from the pixel-of-interest; and $Pb_{D1}$ is the sum of the B pixel values of the pixels that are arrayed in the first direction from the pixel-of-interest.

7. An image-processing apparatus according to claim 1, wherein the occurrence-origin detecting portion determines the pixel-of-interest to be an occurrence origin of on-axis chromatic aberration when the conditional expressions below are satisfied:

$$Pg_{D1} > Pr_{D1};$$

$$Pg_{D1} > Pb_{D1};\text{ and}$$

$$Pg_{D2} < Pb_{D2},$$

where $Pg_{D1}$ is the sum of the G pixel values of the pixels that are arrayed in the first direction from the pixel-of-interest;

$Pg_{D2}$ is the sum of the G pixel values of the pixels that are arrayed in the second direction from the pixel-of-interest;

$Pr_{D1}$ is the sum of the R pixel values of the pixels that are arrayed in the first direction from the pixel-of-interest;

$Pb_{D1}$ is the sum of the B pixel values of the pixels that are arrayed in the first direction from the pixel-of-interest; and $Pb_{D2}$ is the sum of the B pixel values of the pixels that are arrayed in the second direction from the pixel-of-interest.

8. An image-processing apparatus according to claim 1, wherein the occurrence-origin detecting portion determines the pixel-of-interest to be an occurrence origin of on-axis chromatic aberration when the conditional expressions below are satisfied:

$$Pg_{D1} + TH_{R1} > Pr_{D1},$$

$$Pg_{D2} - TH_{R2} < Pr_{D2};$$

$$Pg_{D1} + TH_{B1} > Pb_{D1};\text{ and}$$

$$Pg_{D2} - TH_{B2} < Pb_{D2},$$

where $Pg_{D1}$ is the sum of the G pixel values of the pixels that are arrayed in the first direction from the pixel-of-interest;

$Pg_{D2}$ is the sum of the G pixel values of the pixels that are arrayed in the second direction from the pixel-of-interest;

$Pr_{D1}$ is the sum of the R pixel values of the pixels that are arrayed in the first direction from the pixel-of-interest;

$Pr_{D2}$ is the sum of the R pixel values of the pixels that are arrayed in the second direction from the pixel-of-interest;

$Pb_{D1}$ is the sum of the B pixel values of the pixels that are arrayed in the first direction from the pixel-of-interest;

$Pb_{D2}$ is the sum of the B pixel values of the pixels that are arrayed in the second direction from the pixel-of-interest; and $TH_{R1}$, $TH_{R2}$, $TH_{B1}$, and $TH_{B2}$ are arbitrary constants.

9. An image-processing apparatus according to claim 1, wherein the occurrence-origin detecting portion determines the pixel-of-interest to be an occurrence origin of on-axis chromatic aberration when the conditional expressions below are satisfied:

$$Pg_{D1} + TH_R > Pr_{D1};$$

$$Pg_{D2} + TH_R < Pr_{D2};$$

$$Pg_{D1} + TH_B > Pb_{D1};\text{ and}$$

$$Pg_{D2} + TH_B < Pb_{D2},$$

where $Pg_{D1}$ is the sum of the G pixel values of the pixels that are arrayed in the first direction from the pixel-of-interest;

$Pg_{D2}$ is the sum of the G pixel values of the pixels that are arrayed in the second direction from the pixel-of-interest;

$Pr_{D1}$ is the sum of the R pixel values of the pixels that are arrayed in the first direction from the pixel-of-interest;

$Pr_{D2}$ is the sum of the R pixel values of the pixels that are arrayed in the second direction from the pixel-of-interest;

$Pb_{D1}$ is the sum of the B pixel values of the pixels that are arrayed in the first direction from the pixel-of-interest;

$Pb_{D2}$ is the sum of the B pixel values of the pixels that are arrayed in the second direction from the pixel-of-interest; and $TH_R$ and $TH_B$ are arbitrary constants.

10. An image-processing apparatus according to claim 1, wherein the occurrence-origin detecting portion determines the pixel-of-interest to be an occurrence origin of on-axis chromatic aberration when the conditional expressions below are satisfied:

$$Pg_{D1} > Pr_{D1} \times K_R;$$

$$Pg_{D2} < Pr_{D2} \times K_R;$$

$$Pg_{D1} > Pb_{D1} \times K_B;\text{ and}$$

$$Pg_{D2} < Pb_{D2} \times K_B,$$

where $Pg_{D1}$ is the sum of the G pixel values of the pixels that are arrayed in the first direction from the pixel-of-interest;

$Pg_{D2}$ is the sum of the G pixel values of the pixels that are arrayed in the second direction from the pixel-of-interest;

$Pr_{D1}$ is the sum of the R pixel values of the pixels that are arrayed in the first direction from the pixel-of-interest;

$Pr_{D2}$ is the sum of the R pixel values of the pixels that are arrayed in the second direction from the pixel-of-interest;

$Pb_{D1}$ is the sum of the B pixel values of the pixels that are arrayed in the first direction from the pixel-of-interest;

$Pb_{D2}$ is the sum of the B pixel values of the pixels that are arrayed in the second direction from the pixel-of-interest; and $K_R$ and $K_B$ are arbitrary constants.

11. An image-processing apparatus according to claim 1, wherein the input image has all of R, G, and B pixel values in the individual pixels thereof.

12. An image-processing apparatus according to claim 1, wherein the input image has pixel values in which at least one of R, G, and B pixel values are missing in the individual pixels.

13. An image-processing method comprising:
 a total-pixel-value calculating step of separately calculating, for each color, sums of pixel values of pixels that are arrayed in a first direction and a second direction on either side of a pixel-of-interest in an input image; and
 an occurrence-origin detecting step of detecting the pixel-of-interest as an occurrence origin of on-axis chromatic aberration in the case in which a magnitude relationship between the sum of G pixel values and that of R pixel values of the pixels that are arrayed in the first direction, which are calculated in the total-pixel-value calculating step, is inverted with respect to a magnitude relationship between the sum of G pixel values and that of R pixel values of the pixels that are arrayed in the second direction or in the case in which a magnitude relationship between the sum of the G pixel values and that of B pixel values of the pixels that are arrayed in the first direction is inverted with respect to a magnitude relationship between the sum of the G pixel values and that of B pixel values of the pixels that are arrayed in the second direction;
 a region determining step of determining, as an on-axis-chromatic-aberration region, a predetermined peripheral region that has the occurrence origin of the on-axis chromatic aberration detected in the occurrence-origin detecting step as an origin thereof; and
 a correcting step of correcting the on-axis-chromatic-aberration region determined in the region determining step, in the input image, to thereby generate and output a corrected output image in which the on-axis-chromatic-aberration region has been corrected.

14. A non-transitory computer-readable medium having stored thereon an image-processing program that is executable by a computer to cause the computer to execute:
 a total-pixel-value calculating step of separately calculating, for each color, sums of pixel values of pixels that are arrayed in a first direction and a second direction on either side of a pixel-of-interest in an input image;
 an occurrence-origin detecting step of detecting the pixel-of-interest as an occurrence origin of on-axis chromatic aberration in the case in which a magnitude relationship between the sum of G pixel values and that of R pixel values of the pixels that are arrayed in the first direction, which are calculated in the total-pixel-value calculating step, is inverted with respect to a magnitude relationship between the sum of G pixel values and that of R pixel values of the pixels that are arrayed in the second direction or in the case in which a magnitude relationship between the sum of the G pixel values and that of B pixel values of the pixels that are arrayed in the first direction is inverted with respect to a magnitude relationship between the sum of the G pixel values and that of B pixel values of the pixels that are arrayed in the second direction;
 a region determining step of determining, as an on-axis-chromatic-aberration region, a predetermined peripheral region that has the occurrence origin of the on-axis chromatic aberration detected in the occurrence-origin detecting step as an origin thereof; and
 a correcting step of correcting the on-axis-chromatic-aberration region determined in the region determining step, in the input image, to thereby generate and output a corrected output image in which the on-axis chromatic aberration region has been corrected.

* * * * *